Figure 1:
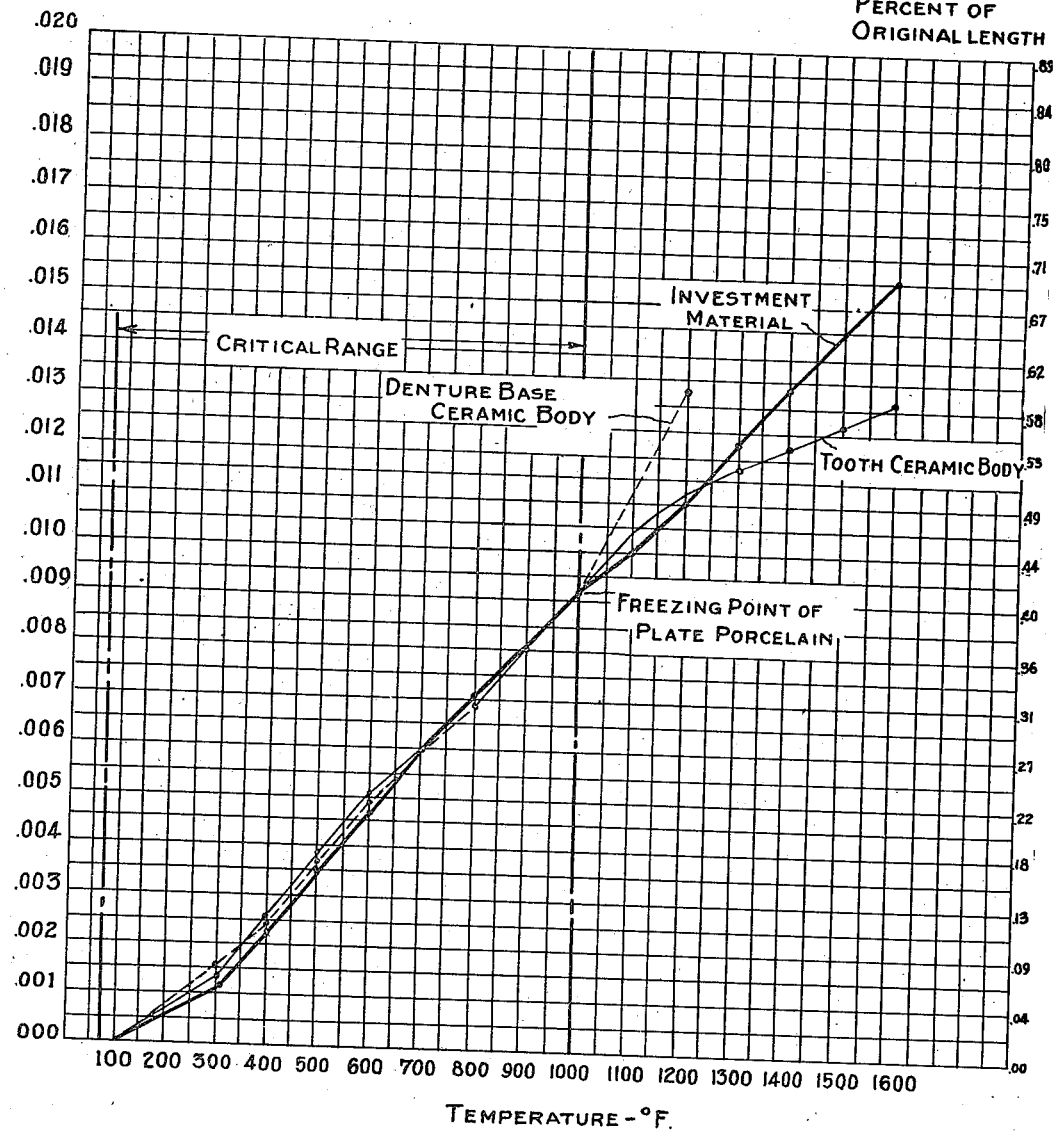

INVENTORS
PYUNGTOO WILLIAM LEE
AND CHARLES DIETZ
BY W. G. Sullivan
ATTORNEY

Patented Feb. 15, 1944

2,341,998

UNITED STATES PATENT OFFICE 2,341,998

ALL CERAMIC DENTURE AND METHOD OF PRODUCING SAME

Pyungtoo William Lee and Charles Dietz, York, Pa., assignors to The Dentists' Supply Company of New York, New York, N. Y., a corporation of New York Original application May 31, 1939, Serial No. 276,644. Divided and this application July 9, 1940, Serial No. 344,501

6 Claims. (Cl. 106—35)

This invention relates to denture base material, and particularly to material for use in the manufacture of all-ceramic dentures.

This application is a division of our co-pending parent application, Serial No. 276,644, filed May 31, 1939, and entitled "All ceramic denture base with teeth, process and materials for producing same," issued August 25, 1942, Patent No. 2,293,908.

In the parent application, it is pointed out that, in the dental art, the moulding or attaching of one vitreous body, such as an artificial tooth, to another body of different composition, such as a denture base, at a temperature lower than the fusing temperature of the higher fusing body, has not heretofore been successfully accomplished by others, although the theory has been advanced, and claimed in dental literature and patent specifications.

In practice, no one heretofore has been able to produce such bodies of different composition, the coefficients of expansion and contraction of which are alike, at least through the critical range from atmospheric temperature to the plastic stage of the material of lower fusing temperature, and from that plastic temperature to atmospheric temperature.

Although patentees have claimed to have accomplished this result, in materials having the same coefficients of expansion and contraction, in most cases, no formulae for the materials have been given, which would give this result, or if formulae have been given, they have been found to be unsuccessful in practice, and articles, and particularly dentures of this nature, have never been produced commercially.

In practice, it has been found that, if the difference in the linear expansions and contractions of the bodies, such as the artificial tooth and denture base ceramic materials, is greater than .001" per linear inch at any point between room temperature and the plastic stage of the lower fusing body, the bodies cannot be united by fusion without producing checks and cracks in one or the other, or both such bodies.

We have found that after a tooth ceramic body and a denture base ceramic body have been produced wherein the thermal contractions of both bodies through the critical range from the plastic stage of the lower fusing body to room temperature are substantially harmonious, an ordinary investment material could not be employed. This is due to the fact that the thermal contraction of the investment material through the aforesaid critical range differs greatly from the thermal contractions of the bodies invested and thereby seriously impairs the finished denture, because of pressures, strains and the like.

Not only must the thermal contractions of the tooth ceramic body and the denture base ceramic body be harmonious throughout the critical range, but the material in which the bodies are invested must also have a thermal contraction through the critical range substantially identical with the thermal contractions of the bodies invested.

An object, therefore, of the invention hereof is to provide a denture base material, the thermal contraction of which, through the critical range, is harmonious with the thermal contractions of the ceramic material forming the teeth and of the investment material.

Another object of the invention is to provide a denture base material, the ingredients of which are so proportioned that a graph of its linear thermal contraction between approximately 1000° F. and room temperature is substantially a straight line.

Another object of the invention is to provide a denture base ceramic body of lower fusing temperature than a tooth ceramic body and to control the composition of the denture base ceramic body as to ingredients and relative proportions to insure substantially harmonious contraction and expansion curves for both bodies at least through the critical range.

According to the invention, feldspar, amorphous silica and borax glass are compounded in such proportions that a graph of the expansion and contraction of such a compound through the critical range between approximately 1000° F. and room temperature is substantially a straight line.

Figure 2:
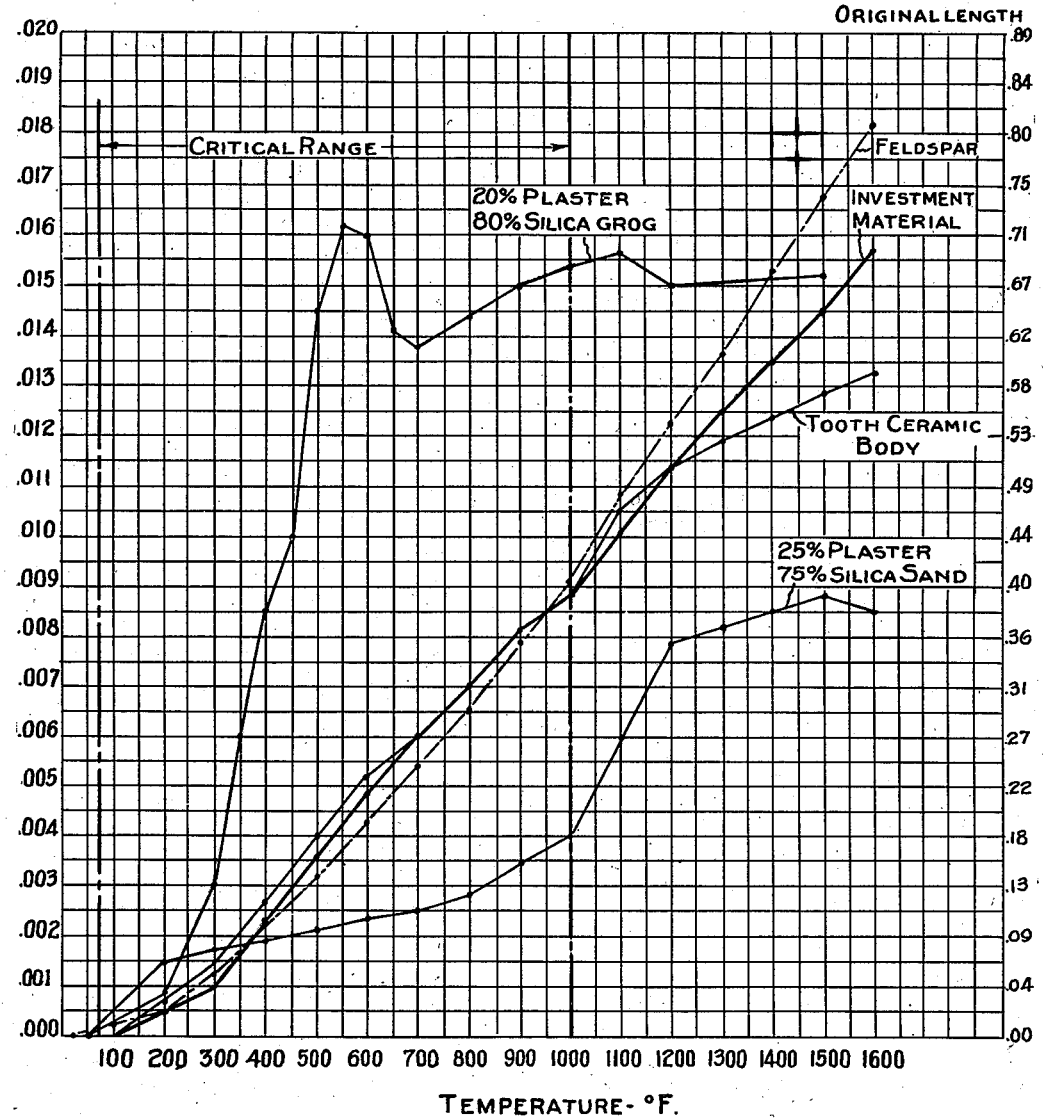
Figure 3:
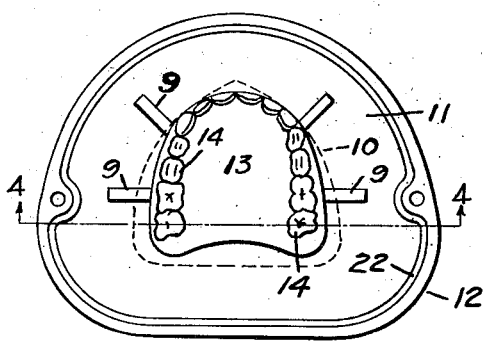
Figure 6:
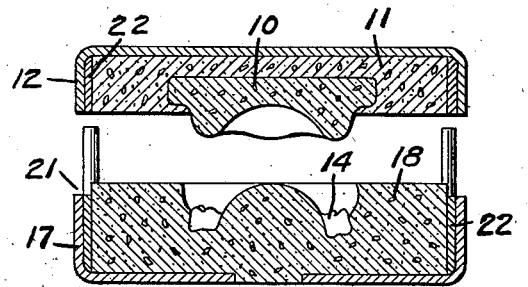
Figure 4:
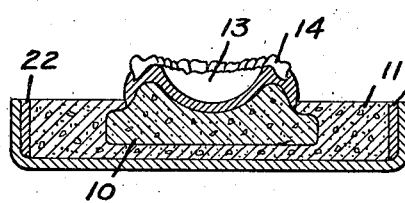
Figure 7:
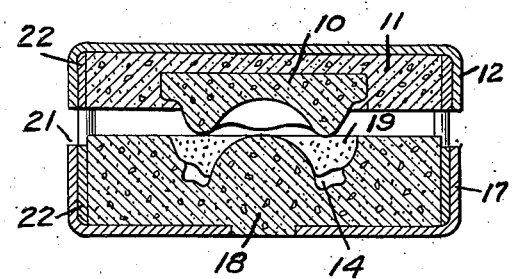
Figure 5:
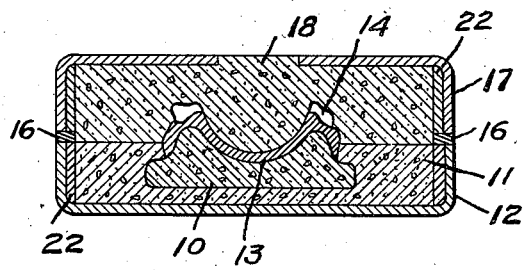
Figure 8:
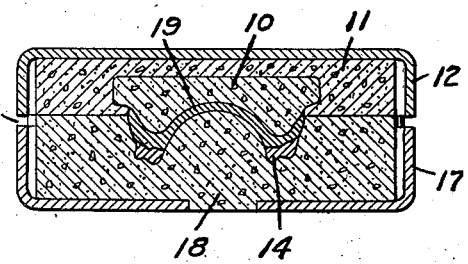

In the drawings,

Figure 1 is a graph sheet having as abscissae degrees of temperature in Fahrenheit scale, and as ordinates linear expansion graded in thousandths of an inch, the thermal expansions of the novel tooth ceramic body, the novel denture ceramic body and the contraction of the novel investment material have been graphically plotted from readings indicated on the most accurate known scientific instrument for this purpose, Figure 2 is a similar sheet and depicts the thermal expansion curves of two commercial investment materials of general use, ordinary feldspar, the thermal contraction curve of the novel investment material, and the thermal contraction curve of the novel tooth ceramic material, Figure 3 is a plan view of a denture base model invested in one half of an investment flask and shows a temporary denture base with teeth attached applied to said model, Figure 4 is a cross-sectional view along the line 4—4 of Figure 3, Figure 5 is a view similar to Figure 4 showing the other half of the flask applied and the temporary denture with teeth invested therein, Figure 6 is a similar view showing the flask inverted and separated and the temporary denture base removed, Figure 7 is a like view showing the novel denture base ceramic body residing in the space formerly occupied by the temporary denture base, and the flask parts re-united, and Figure 8 is a like view showing the relation of parts after fusion of the denture base ceramic body.

In Figure 1, the thermal expansion and contraction curve for the tooth ceramic body is shown by a full light line and marked "Tooth ceramic body." The common and principal ingredients from which artificial porcelain teeth are usually produced are feldspar, kaolin and silica. Their proportions may differ. As a ceramic body for the artificial teeth giving the thermal expansion and contraction curve shown in Figure 1, we have devised a formula as follows:

| | Per cent |
|---|---|
| Feldspar | 70 to 90 |
| Amorphous silica | 10 to 30 |

The teeth of this ceramic body may be manufactured either for general commercial use containing the usual dental pins, either of base or precious metal, or may be provided with other means for fastening them to usual and ordinary denture bases. For the purpose of this invention, all such fastening devices may be eliminated, and we shall hereafter refer to teeth without any of these fastening devices as "bare teeth."

In the prior art, numerous ceramic bodies for forming denture bases have been discussed. It has, however, been found that none of the disclosures will give a thermal expansion and contraction curve in any way approximating the curve of the tooth ceramic body shown in Figure 1.

The denture base ceramic body of this invention is compounded in such a way that its thermal expansion and contraction are substantially harmonious with the thermal expansion and contraction of the porcelain of the teeth. This is especially so through the critical range which comprises from atmospheric temperature up to the fusing temperature of the denture base ceramic body, or vice versa. It is especially important that the contraction curves be in agreement from the softening point of the denture base material down through the hardening range to room temperature in order that no cracking may occur, and in order that a perfect union between the two ceramic bodies may be effected.

The softening, maturing or fusing point of the denture base material may be considerably lower than the fusing point of the tooth material. The fusing point of the tooth material may be from approximately 2300° to 2400° F. while the fusing point of the denture base material may be from approximately 1500° to 1600° F. Consequently, the ceramic body of which the teeth are made may be termed a high-fusing dental porcelain while the ceramic body of which the denture plate or base is made is between porcelain and glass, probably being closer to glass than to porcelain. The denture base ceramic body which has been developed and which produces a thermal expansion and contraction curve, such as that marked in Figure 1 of the drawings "Denture base ceramic body" has the following formula:

| | Per cent |
|---|---|
| Feldspar | 65 to 80 |
| Amorphous silica | 10 to 20 |
| Borax glass | 5 to 15 |

In the ceramic bodies of both the tooth and denture base we have utilized amorphous silica for the following reasons:

1. It produces a low coefficient of expansion and contraction;
2. The substitution of amorphous silica for regular silica in the bodies lowers their maturing or fusing temperature;
3. It eliminates the silica inversions, thereby producing a curve nearer to a straight line;
4. Because of its very fine particle size, it can be more easily and uniformly mixed in the bodies, and lowers their fusing temperatures;
5. It produces stronger bodies.

Under proper control of temperature and time of firing, the tooth and denture base ceramic bodies of the foregoing formulae will expand and contract in substantial harmony.

In carrying out the process of forming our improved denture the teeth are moulded and fired in the usual way. A model 10 made from the investment material and exactly duplicating in size and form the area to be covered by the denture base is cast, and this is invested in the investment material 11 in the usual manner in the lower half 12 of a flask. Suitable escapeways 9, as usually provided, may also be provided in carrying out this process. On this model 10 is a temporary denture base 13 composed of material which can be readily melted and which has the artificial teeth 14 set therein. This temporary denture base 13 is identical in form with the permanent denture base to be produced. (See Figures 3 and 4.) The lower half of the flask then has a liner or gasket 16 placed on its upstanding peripheral edge, and the upper half 17 of the flask separated from the lower half by this liner. Investment material 18 identical with the material 11 and with the material of the model 10 is then poured in through openings in the top of the upper half 17 of the flask until the same is completely filled. (See Figure 5.) After the investment material in the upper half 17 has set or hardened so as to secure the artificial teeth therein the flask may be inverted, heated or boiled, its parts separated, and the temporary denture base melted or washed out. This also washes the material from the escapeways 9. (See Fig. 6.) The liner 16, which formerly separated the halves of the flask, is then removed and the novel ceramic body 19 of the denture base filled into the space formerly occupied by the temporary denture base 13. The halves of the flask are then re-united and there will be a space 21 between the edges of the same formerly occupied by the liner 16. (See Fig. 7.)

In addition to the technical difficulty of developing a high fusing tooth ceramic body and a low fusing base ceramic body which are in substantial harmony in expansion and contraction, certain practical advantages are obtained by having the denture base ceramic body fused around 700 to 800° F. lower than the tooth ceramic body. For example, there is no danger of the pre-formed tooth being deformed by a heat too close to its softening temperature. The temperature cited will not affect stains or other markings placed on the face of the teeth to achieve certain artistic effects. The type of investment used to form the denture plates need not be excessively high fusing. The furnace for fusing the plate ceramic body to the teeth need not be intricate or expensive. The metal flask just above described in which the fusing is accomplished may be made from several inexpensive alloys which will withstand a temperature of 1600° F. or more.

Before placing investment material in either section of the flask the side walls of the same have been lined with material 22 which will burn out, compress or otherwise allow for the expansion of the investment material as shown and described in the co-pending application of Pyungtoo William Lee, one of the applicants herein, Serial No. 247,483, filed December 23, 1938.

In order to make the denture plate exactly fit the particular mouth for which it is designed, the denture plate must be formed while plastic over an exact model of the particular mouth. This is the model shown in Figures 3 to 8 of the drawings, and must be made of an investment composition which has a thermal contraction in agreement and harmony with the contractions of both the tooth ceramic body and denture base or plate ceramic body in order that no checking or fracturing of the teeth or plate shall occur in the cooling process.

Dental investment compositions generally contain a considerable portion of quick setting material, such as gypsum, or plaster of Paris, together with siliceous materials such as silica-sand and fire clay grog.

In the drawings, Figure 2 shows a thermal expansion curve of an investment material having 20% plaster of Paris and 80% silica grog. That same figure shows another thermal expansion curve of an investment material having 25% plaster of Paris and 75% silica sand. The thermal expansion curve of gypsum-silica mixtures as shown is generally characterized by certain sharp breaks due to silica inversions and to dehydration of the sulphate. It has been shown in Figure 1 that the thermal expansion and contraction curves of the new tooth ceramic body and of the new denture base ceramic body have been brought into practical conformity whereas the curves of the commercial investment materials shown in Figure 2 are widely divergent from the curves of the tooth and base ceramic materials, the former of which is also shown in Figure 2. A denture base formed in investments such as those indicated as "commercial" would be badly cracked when cooled.

We have found that feldspar has a very uniform curve of expansion. A thermal expansion and contraction curve of feldspar is shown in Figure 2. We have further found that an investment compound of the following general proportions will give a thermal contraction curve in substantial harmony with the curves of the tooth and denture base ceramic bodies hereinbefore described. The formula for this investment material is as follows:

| | Per cent |
|---|---|
| A form of calcium sulphate (Hydrocal) | 10 to 25 |
| Feldspar | 30 to 80 |
| Silica grog | 10 to 45 |

The thermal contraction curve of this investment material is shown in Figures 1 and 2.

In Figure 2, we, therefore, find that through the critical range which we have before discussed, the linear thermal contractions of the tooth ceramic body, the denture base ceramic body and the investment material are always controlled so as to never vary one from the other more than one-half of one thousandth of an inch per linear inch.

After the denture base ceramic body 19 has been placed in the recess formerly occupied by the temporary denture base and the flask sections re-united, the flask is then placed in a kiln and the temperature gradually raised to the softening temperature of the denture base ceramic body whereupon pressure is preferably added to the top of the flask to accelerate the coming together of the sections of the flask. (See Fig. 8.) This may be accomplished by merely placing a weight of a few pounds on the upper flask section. It, of course, will be readily seen that the upper part of the flask will by its weight or by gravity come into contact with the lower part of the flask when the denture base ceramic body becomes soft, but the weight will hasten that step and allow for cutting off the heat to the kiln. Adding the weight or pressure to the upper part of the flask saves time and fuel, and permits the temperature from going beyond the necessary temperature to soften the denture base ceramic body.

Among the advantages of the invention are its effective employment in partial plates, the preservation, and prevention of fading of, a natural gum pink color, the freedom from warpage, the imperviousness to infiltration of mouth acids, and therefore its ability to remain clean and free from odors, its pleasant feeling on the oral tissues, the better adaptation to, and fitting of, these tissues, and the removal of the danger of the teeth dropping therefrom.

Of course, the denture base material may be modified in various ways without departing from the invention set forth and described in the appended claims.

The invention is hereby claimed as follows:

1. A denture base ceramic body for attachment in fused relation to a tooth ceramic body, said base ceramic body containing substantially 65 to 80 per cent feldspar, 10 to 20 per cent amorphous silica and 5 to 15 per cent borax glass, and said base comprising said ingredients in such proportions that the thermal contractions of said bodies through a range extending at least from the freezing point of the base to atmospheric temperature are in substantial harmony, said base having a fusing point of from approximately 1500° to 1600° Fahrenheit.

2. A denture base ceramic body for attachment in fused relation to a tooth ceramic body, said base ceramic body containing substantially 65 to 80 per cent feldspar, 10 to 20 per cent amorphous silica and 5 to 15 per cent borax glass, and said base comprising said ingredients in such proportions that the thermal contractions of said bodies through a range extending from the freezing point of the base to atmospheric temperature vary less than .001 inch per linear inch and are in substantial harmony, said base having a fusing point of from approximately 1500° to 1600° Fahrenheit.

3. A denture base ceramic body of relatively low fusing temperature for moulding attachment to an artificial tooth body of high fusing temperature in cooperation with a body of investment material to form a unitary ceramic denture, said base comprising substantially 65 to 80 per cent feldspar, 10 to 20 per cent amorphous silica and 5 to 15 per cent borax glass, whereby said base has a fusing point of from approximately 1500° to 1600° Fahrenheit and its thermal contraction from its freezing point to room temperature is in substantial harmony with the thermal contractions of said tooth and investment bodies.

4. A denture base ceramic body of relatively low fusing temperature for moulding attachment to an artificial tooth body of high fusing temperature in cooperation with a body of investment material to form a unitary ceramic denture, said base comprising substantially 65 to 80 per cent feldspar, 10 to 20 per cent amorphous silica and 5 to 15 per cent borax glass, whereby said base has a fusing point of from approximately 1500° to 1600° Fahrenheit and its thermal contraction from its freezing point to room temperature varies less than .001 inch per linear inch from the thermal contractions of the tooth and investment bodies.

5. A denture base ceramic body for attachment in fused relation to a tooth ceramic body comprising 70 to 90 per cent feldspar and 10 to 30 per cent amorphous silica, said base ceramic body comprising 65 to 80 per cent feldspar, 10 to 20 per cent amorphous silica and 5 to 15 per cent borax glass, and said base comprising said ingredients in such proportions that the thermal contractions of said bodies through a range extending at least from the freezing point of the base to atmospheric temperature are in substantial harmony.

6. The method of providing a denture base ceramic body adapted to be fused to an artificial tooth ceramic body comprising 70 to 90 per cent feldspar and 10 to 30 per cent amorphous silica, said tooth ceramic body having a predetermined thermal contraction curve and a relatively higher fusing temperature than the denture base ceramic body, said method comprising the steps of providing a denture base ceramic body comprising 65 to 80 per cent feldspar, 10 to 20 per cent amorphous silica, and 5 to 15 per cent borax glass, and proportioning the ingredients of the denture base ceramic body so that the thermal contraction curve of the base ceramic body will substantially correspond to the thermal contraction curve of the tooth ceramic body at least from the fusing temperature of the base ceramic body to atmospheric temperature.

PYUNGTOO WILLIAM LEE.
CHARLES DIETZ.